(12) United States Patent
Bucher et al.

(10) Patent No.: US 11,312,470 B2
(45) Date of Patent: Apr. 26, 2022

(54) PRESSURE BULKHEAD FOR AN AIRCRAFT

(71) Applicant: Premium Aerotec GmbH, Augsburg (DE)

(72) Inventors: Raimund Bucher, Buchloe (DE);
Klaus Edelmann, Ganderkesee (DE);
Angelos Miaris, Bremen (DE);
Dominik Rath, Untermeitingen (DE);
Frank Stellberger, Hamburg (DE)

(73) Assignee: Premium Aerotec GmbH, Augsburg (DE)

( * ) Notice: Subject to any disclaimer, the term of this patent is extended or adjusted under 35 U.S.C. 154(b) by 372 days.

(21) Appl. No.: 16/288,865

(22) Filed: Feb. 28, 2019

(65) Prior Publication Data

US 2019/0270505 A1 Sep. 5, 2019

(30) Foreign Application Priority Data

Mar. 2, 2018 (EP) .................................... 18 159748

(51) Int. Cl.
*B64C 1/10* (2006.01)
(52) U.S. Cl.
CPC ...................... *B64C 1/10* (2013.01)
(58) Field of Classification Search
CPC ... B64C 1/10; B64C 1/069; B64C 2001/0054; B64C 2001/0072; B64F 5/00
See application file for complete search history.

(56) References Cited

U.S. PATENT DOCUMENTS

| 6,378,805 | B1 * | 4/2002 | Stephan | B64C 1/10 |
| | | | | 244/117 R |
| 8,939,404 | B2 * | 1/2015 | Sayilgan | B64C 1/068 |
| | | | | 244/119 |
| 9,187,168 | B2 * | 11/2015 | Rosman | B64C 1/10 |
| 9,637,215 | B2 | 5/2017 | Joern et al. | |
| 9,776,704 | B1 * | 10/2017 | Rufino | B29C 70/384 |
| 10,053,205 | B2 * | 8/2018 | De Jong | B64C 1/10 |
| 10,189,578 | B2 * | 1/2019 | Diep | B62D 25/00 |
| 10,464,691 | B2 * | 11/2019 | Diep | B64C 1/10 |
| 10,549,488 | B2 * | 2/2020 | Pfau | B64C 1/06 |
| 10,604,225 | B2 * | 3/2020 | Orlov | B64C 1/10 |
| 10,926,857 | B2 * | 2/2021 | McNamara | B64C 1/069 |

(Continued)

FOREIGN PATENT DOCUMENTS

| DE | 10 2013 224 233 A1 | 5/2015 | |
| DE | 102017221444 A1 * | 5/2019 | .......... B64C 1/1446 |

(Continued)

OTHER PUBLICATIONS

European Search Report for Application No. 18159748.5 dated May 16, 2018.

*Primary Examiner* — Benjamin P Lee
(74) *Attorney, Agent, or Firm* — Jenkins, Wilson, Taylor & Hunt, P.A.

(57) ABSTRACT

A pressure bulkhead for the pressure-tight axial closure of a pressurized fuselage of an aircraft or spacecraft that is capable of being put under internal pressure includes dome segments, having an integrated reinforcement, in particular a peripheral reinforcement, which are in each case made integrally from a fiber-reinforced thermoplastic plastics material, and are joined to one another so as to form a pressure dome.

10 Claims, 2 Drawing Sheets

(56) References Cited

U.S. PATENT DOCUMENTS

| | | | |
|---|---|---|---|
| 2012/0228427 A1* | 9/2012 | Sayilgan | B64C 1/061 |
| | | | 244/121 |
| 2014/0370227 A1* | 12/2014 | Diep | B64C 1/10 |
| | | | 428/66.4 |
| 2015/0037541 A1* | 2/2015 | Rosman | B64C 1/10 |
| | | | 428/174 |
| 2016/0257392 A1* | 9/2016 | Orlov | B64C 1/10 |
| 2016/0257393 A1* | 9/2016 | Orlov | B64C 1/10 |
| 2016/0288897 A1* | 10/2016 | De Jong | B64F 5/00 |
| 2017/0137107 A1* | 5/2017 | Zuardy | B64C 1/064 |
| 2017/0291678 A1* | 10/2017 | Jerstad | B64C 1/10 |
| 2018/0072400 A1* | 3/2018 | Deobald | B29C 66/0246 |
| 2019/0106222 A1* | 4/2019 | Diep | B62D 25/00 |
| 2019/0210706 A1* | 7/2019 | Zeeb | B64C 1/10 |
| 2021/0031900 A1* | 2/2021 | Partouche | B64C 1/10 |

FOREIGN PATENT DOCUMENTS

| | | |
|---|---|---|
| EP | 2 098 448 A1 | 9/2009 |
| EP | 2 813 425 A1 | 12/2014 |
| EP | 2 485 941 B1 | 8/2015 |
| EP | 3 075 524 A1 | 10/2016 |
| WO | WO 99/24316 A1 | 5/1999 |

\* cited by examiner

PRESSURE BULKHEAD FOR AN AIRCRAFT

CROSS-REFERENCE TO RELATED APPLICATION

This application claims priority to European Patent Application EP 18159748.5 filed Mar. 2, 2018, the entire disclosure of which is incorporated by reference herein.

TECHNICAL FIELD

The disclosure herein relates to a pressure bulkhead for the pressure-tight axial closure of a pressurized fuselage of an aircraft or spacecraft that is capable of being put under an internal pressure.

BACKGROUND

In order for an internal pressure of a passenger cabin to be maintained at a suitable level, for example atmospheric pressure, even in the case of high flight altitudes, passenger aircraft at an aft axial end have a pressure bulkhead which establishes a pressure tightness of the passenger cabin in relation to the primary structure of the aircraft fuselage. In modern aircraft construction, efforts are made to save weight as far as possible and, at the same time, to achieve adequate rigidity and robustness in respect of the many and various loads which arise. To this end pressure bulkheads can be made from metallic materials such as, for example, aluminum or an aluminum alloy, and/or fiber-reinforced composite materials such as carbon-fiber reinforced plastics material (CFRP), in particular having a plastics material matrix from epoxy resin. Metallic pressure bulkheads can often be produced in a more cost-effective manner than pressure bulkheads from a fiber-composite material of the type, however instead typically have a significantly higher weight.

The actual pressure bulkhead in typical design embodiments has a dome-type basic shape which is convex in the aft direction of the aircraft and which also is referred to as a pressure dome. The pressure dome in particularly highly stressed regions can furthermore be provided with elongate and/or net-type reinforcement elements, cf. for example publications EP 2 098 448 A1, EP 2 485 941 B1, and DE 10 2013 224 233 A1. Such a pressure bulkhead can generally comprise further structural elements which are required for the pressure-tight closure of the respective region of the aircraft fuselage and for the transmission of the forces resulting from the internal pressure into the fuselage shell structure of the aircraft. For example, the pressure dome by way of intermediate pieces and further components can be linked to one or a plurality of encircling formers and/or an outer skin of the fuselage. Such pressure bulkheads occasionally have scattered passage openings for supply lines such as pipes, hydraulic and/or pneumatic lines, or the like (cf. DE 10 2013 224 233 A1, for example). In order for the pressure-tightness of the pressure bulkhead to continue to be guaranteed, the openings after the assembly can be closed in a permanently pressure-tight manner, for example by way of a fixedly attached fitting.

SUMMARY

Against this background, the disclosure herein is based on an object of finding improved solutions for the pressure-tight axial closure of a passenger cabin.

This object is achieved according to the disclosure herein by a pressure bulkhead and by an aircraft or spacecraft having features disclosed herein.

Accordingly, a pressure bulkhead for the pressure-tight axial closure of a pressurized fuselage of an aircraft or spacecraft that is capable of being put under an internal pressure is provided. The pressure bulkhead comprises a plurality of dome segments, having an integrated reinforcement, which are in each case made integrally from a fiber-reinforced thermoplastic plastics material, and are joined to one another so as to form a pressure dome.

Furthermore provided is an aircraft or spacecraft having a pressure dome according to the mention.

A concept underlying the disclosure herein lies in constructing a pressure dome of a pressure bulkhead from a plurality of individual segments having integrated reinforcements in such a manner that the cost outlay corresponds approximately to that of a conventional metal structure, for example an aluminum structure. In the disclosure herein, by contrast to conventional solutions, to this end relatively simply constructed fiber-composite components are made in a cost-effective manner using a thermoplastic plastics material, and are subsequently joined so as to form a pressure dome. The reinforcements herein are advantageously integrated directly in the individual segments. By contrast, conventional constructions follow two different approaches. In the case of a widely used approach, a dome body is made from a metal material, corresponding reinforcement elements from metal being subsequently riveted to the dome body (an integral production of the reinforcement elements is not practically possible in this variant). In the case of other conventional solutions, a pressure dome is provided as a complex, in particular monolithic, fiber-composite construction which is typically made by a resin-injection method (RTM—resin transfer molding) or by manual lamination or similar complex methods. As opposed thereto, the use of a thermoplastic plastics material according to the disclosure herein inter alia offers the advantage that planar structures of a simple shape, having reinforcement elements configured in an open manner, can be rapidly and efficiently produced. For example, a plastics-material plate, for example an organic sheet having a thermoplastic plastics material such as polyphenylene sulfide (PPS) or the like, can be heated and using a simple tool be molded, for example in a press, so as to have reinforcement profiles such as Z-shaped or O-shaped reinforcements. As a result, weight can be saved as compared to metallic solutions, as well as costs as compared to monolithic fiber-composite solutions. The individual segments can be made by way of a short throughput time, wherein no additional investments have to be made for reinforcements or the like. Simple geometric modifications or adaptations, respectively, are rapidly implementable at any time by virtue of the modular construction. In principle, the dome segments can be made in an identical manner and only in a second production step, depending on the application, be subsequently configured so as to have dissimilar additional reinforcements, conduits, and the like.

A pressure dome in the context of the disclosure herein is understood to be a dome-shaped pressure wall with in a fuselage of an aircraft or spacecraft, the pressure wall generally having a concave internal face and convex external face which both are curved in such a manner that a convexity in the axial direction, for example in the aft direction, is formed within the fuselage.

A pressurized fuselage in the sense according to the disclosure herein is a fuselage region of an aircraft or spacecraft that can be closed off in a pressure-tight manner and can be maintained at atmospheric pressure, for example. A pressurized fuselage in the sense according to the disclosure herein can comprise a passenger cabin with one or more passenger decks and/or a cargo hold or cargo deck, for example.

Advantageous embodiments and refinements are apparent from the description with reference to the figures.

According to one refinement, the dome segments about a center of the pressure dome are disposed beside one another along an azimuthal direction of the pressure dome. The dome segments can be shaped, for example, as spherical triangles. The spherical triangles can in particular taper towards the center of the pressure dome. It will herein be obvious to a person skilled in the art that an opening about the center of the pressure dome can remain for reasons of production technology such that the dome segments only substantially have the shape of a spherical triangle. The spherical triangle herein can in particular be truncated at a radially inboard corner. The dome segments can thus be disposed in an annular manner about the center, having a conically tapered, spherically curved shape. The dome segments and thus the pressure dome herein have in principle concave internal faces and convex external faces so as to absorb the forces of the aircraft that result from the internal pressure and to introduce the forces into the fuselage shell. The centric opening in the interior can be closed in a pressure-tight manner by a cover or the like.

According to one refinement, the integrated reinforcement can be aligned along a radial direction of the pressure dome. The integrated reinforcements can thus be aligned toward the center of the pressure dome.

According to one refinement, the integrated reinforcement can have a reinforcement profile. The reinforcement profile can project from a concave internal face of the respective dome segment. The reinforcement profile can thus be disposed on the inside in terms of a passenger cabin in a fuselage of an aircraft.

According to one refinement, the reinforcement profile can be configured so as to be Z-shaped and/or O-shaped. In principle however, further open reinforcement profiles which can be readily demolded are likewise provided.

According to one refinement, the integrated reinforcement can be configured on one side as a peripheral reinforcement. The dome segments by way of the integrated reinforcement can in each case be joined to a mating region of the nearest dome segment. The mating region of the nearest dome segment can be reinforced or non-reinforced. For example, the integrated reinforcement can be disposed so as to run radially on one side of the dome segments. The individual dome segments can thus be joined to one another in the manner of cake slices, in that one dome segment, by way of the side having the integrated peripheral reinforcement, is in each case joined to a reinforced or non-reinforced side of another dome segment.

According to one refinement the dome segments can be joined to one another by riveting, welding, and/or adhesive bonding.

According to one refinement, the pressure bulkhead can furthermore have local reinforcements. The local reinforcements can be joined to the dome segments. For example, the pressure dome by way of the reinforcements can be fastened to the fuselage of the aircraft. In a specific example, the pressure dome by way of a plurality of local reinforcements is fastened to an encircling circular former of the aircraft.

According to one refinement, the local reinforcements can be joined to the dome segments by riveting, welding, and/or adhesive bonding.

According to one refinement, at least a portion of the local reinforcements can be aligned along the azimuthal direction of the pressure dome. For example, local reinforcements can run along an external periphery of the dome segments in terms of the center of the pressure dome, such that an encircling external annular reinforcement is formed along an external periphery of the pressure dome.

According to one refinement, at least a portion of the local reinforcements can be disposed in an annular manner about passage openings in the dome segments. The passage openings can serve, for example, as systems conduits for pipes, hydraulic and/or pneumatic lines, or the like.

According to one refinement, the dome segments can have a variable dome thickness. For example, a plurality of dome segments having dissimilar thicknesses can be combined with one another in a modular manner.

According to one refinement, joint transitions between the dome segments can be closed by a sealant, a caulking material, and/or sealing elements. Caulking materials herein comprise, for example, gusset fillers and similar materials. For example, sealing wedges, caps, or other elements known to a person skilled in the art can be used as sealing elements. Moreover, further advantageous approaches can be pursued by virtue of thermoplastic configuration of the dome segments. For example, snippets of a thermoplastic plastics material can be incorporated in the joint transitions and in the latter can be fused, or welded, respectively, to the dome segments. On account thereof, it can inter alia be ensured that the external face of the joint transition is configured so as to be as even as possible such that the pressure dome can be fastened with minimum tolerances to a metallic circular former or the like.

The above embodiments and refinements can be combined in any desired manner, as and when appropriate. Further possible embodiments, refinements and implementations of the disclosure herein also include combinations, not explicitly mentioned, of features of the disclosure herein that are described above or below with reference to the example embodiments. In this context, a person skilled in the art will, in particular, also add individual aspects as improvements or supplementary features to the respective basic form of the disclosure herein.

BRIEF DESCRIPTION OF THE DRAWINGS

The disclosure herein is explained in greater detail below by the example embodiments indicated in the schematic figures in which.

Figure 1:
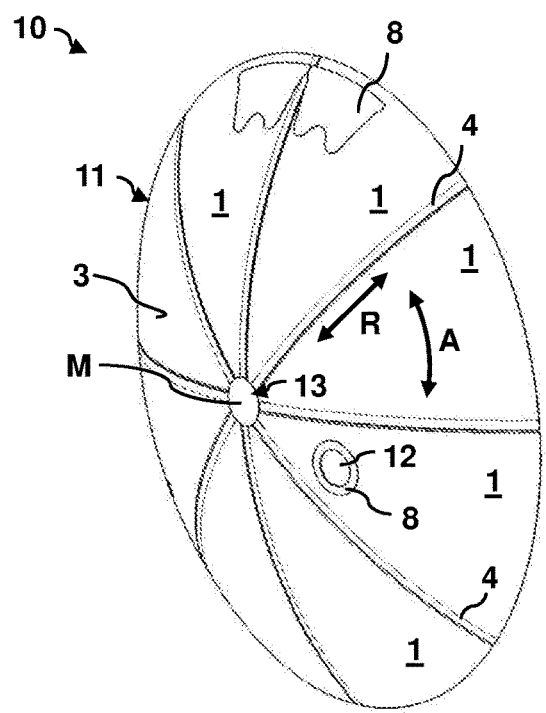
FIG. 1 shows a schematic perspective external view of a pressure bulkhead according to an embodiment of the disclosure herein.

The appended figures are intended to impart further understanding of the embodiments of the disclosure herein. The appended figures visualize embodiments and in conjunction with the description serve for explaining principles and concepts of the disclosure herein. Other embodiments and many of the stated advantages will become apparent when viewing the drawings. The elements of the drawings are not necessarily shown to scale relative to one another.

DETAILED DESCRIPTION

In the figures of the drawing, identical, functionally identical and identically acting elements, features and components are each provided with the same reference signs, unless stated otherwise.

Figure 2:
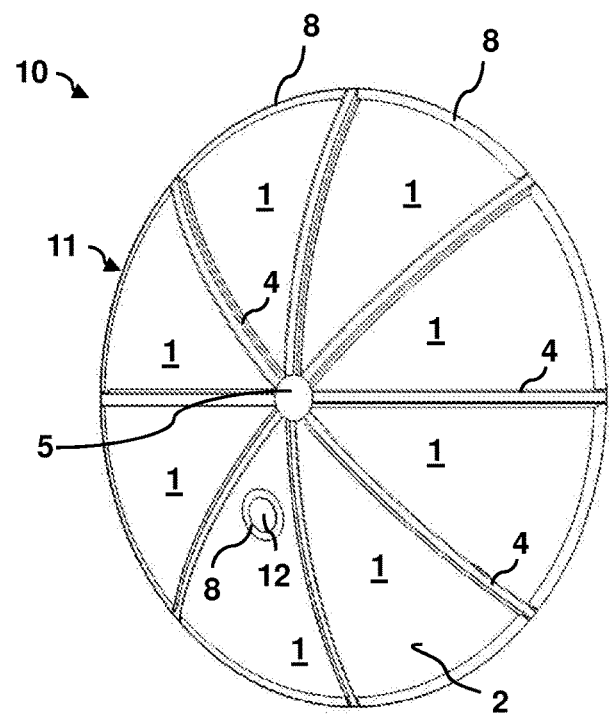
FIG. 2 shows a schematic perspective internal view of the pressure bulkhead from FIG. 1.
Figure 3:
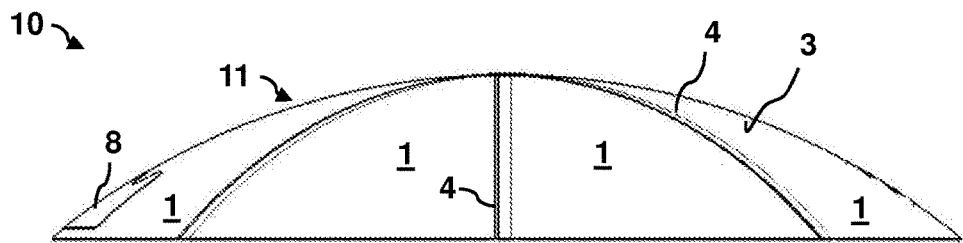
FIG. 3 shows a schematic side view of the pressure bulkhead from FIG. 1.

FIG. 1 shows a schematic perspective external view of a pressure bulkhead 10 according to an embodiment of the disclosure herein. FIGS. 2 and 3 show the pressure bulkhead 10 in a perspective internal view and a side view.

Figure 6:
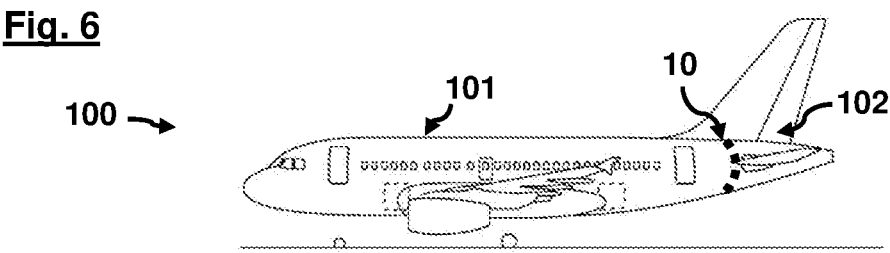
FIG. 6 shows a schematic side view of an aircraft having the pressure bulkhead from FIGS. 1 through 5.

The pressure bulkhead 10 forms a pressure-tight closure of a pressurized fuselage 101 of an aircraft 100 in an axial direction in relation to an aft region 102 of the aircraft 100 (cf. FIG. 6). For example, the aircraft 100 illustrated can be a passenger aircraft, for example a narrow-bodied aircraft, which has a pressurized fuselage 101 maintained at atmospheric pressure and a passenger deck situated in the latter. The passenger deck can extend, for example, from a cockpit (not shown) across the entire longitudinal extent of the pressurized fuselage 101 up to the pressure bulkhead 10. The embodiment of the aircraft 100 shown is to be understood to be only example of a general passenger aircraft. For example, further passenger decks, freight decks, etc., for example two passenger decks lying below one another, can likewise be provided.

The pressure bulkhead 10 comprises a pressure dome 11 having a concave internal face 2 and a convex external face 3. The pressure dome 11 forms a pressure wall having a convexity counter to a flight direction, that is to say in the direction of the aft region 102. The pressure dome 11 is joined together from a plurality of dome segments 1 which, having an integrated reinforcement 4, are in each case made integrally from a fiber-reinforced thermoplastic plastics material. The dome segments 1 about a center M of the pressure dome 11 are disposed along an azimuthal direction A of the pressure dome 11. The integrated reinforcement 4 of the dome segments 1 is in each case aligned along the radial direction R of the pressure dome 11. The dome segments 1 have approximately the shape of spherical triangles which in the radial direction R of the pressure dome 11 taper towards the center of the pressure dome 11, wherein the triangles are truncated at a radially inboard corner. A central passage 13 which from the concave internal face 2 of the pressure dome 11 is closed in an air-tight manner by a cover 5 (cf. FIG. 2) is kept free for reasons of production technology about the center M of the pressure dome 11.

In a purely example manner, a multiplicity of dissimilar local reinforcements 8 are moreover joined to the dome segments 1. The local reinforcements 8 can serve various purposes. For example, a proportion of the local reinforcements 8 in an annular manner is disposed along the azimuthal direction A of the pressure dome 11 on an external periphery of the pressure dome 11. The elements reinforce the pressure dome 11 in an external region, on the one hand. The pressure dome 11 by way of the elements can be linked to the pressurized fuselage 101 of the aircraft 100, on the other hand, for example at an encircling circular former (not shown), wherein various connection elements (likewise not indicated) can be provided. Furthermore, further special local reinforcements 8 can be configured for linking to the pressurized fuselage 101, or for the absorption and/or transmission of fuselage stresses, respectively. Two further local reinforcements 8 which can serve, for example, for coupling the pressure bulkhead 10 to a vertical stabilizer or similar are indicated in a purely example manner at the top in FIG. 1. An aircraft 100 of this type, or a pressurized fuselage 101 of this type, respectively, in flight is exposed to significant loads and stresses. Various forces and moments are to be considered herein, such as transverse forces, torsional and flexural moments, etc. Forces are moreover also exerted on account of the significant internal pressure. The pressure bulkhead 10, or the pressure dome 11, respectively, are configured for intercepting and/or dissipating the incoming and/or outgoing loads.

A further proportion of the local reinforcements 8 can be disposed in an annular manner about passage openings 12 in the dome segments 1 (only one passage opening 12 is indicated in an example manner). A passage opening 12 of this type can be utilized for various purposes. For example, the passage opening 12 can serve as a systems conduit for pipes, hydraulic and/or pneumatic lines, or the like. In alternative embodiments, further passage openings 12 can be provided, for example radially externally on the pressure dome 11 so as to carry out inspection, assembly and/or maintenance jobs on the pressure bulkhead 10 and in particular on the surrounding aft region 102. The passage opening 12 can be closed in a pressure-tight manner by way of a pressure cover (not indicated here).

Figure 4:
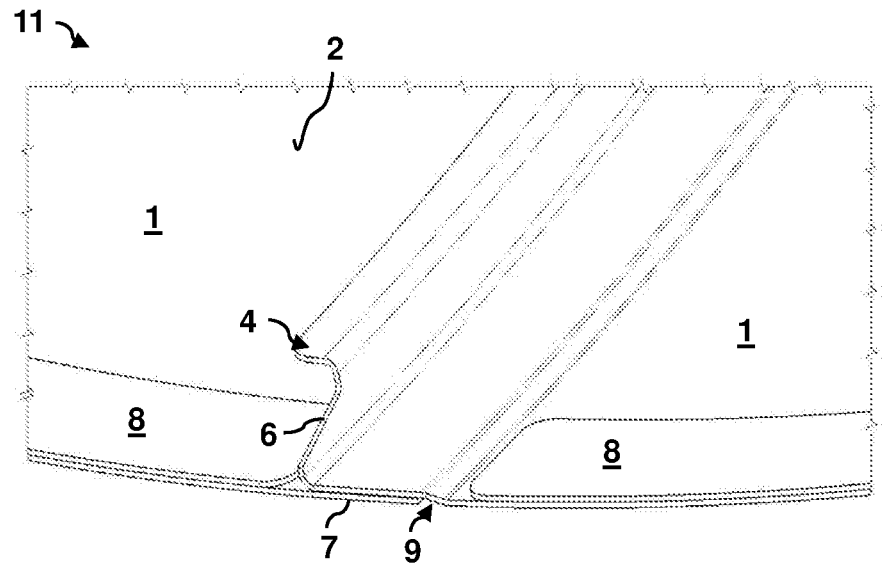
FIG. 4 shows a schematic perspective detailed view of a joint transition of the pressure bulkhead from FIG. 2.
Figure 5:
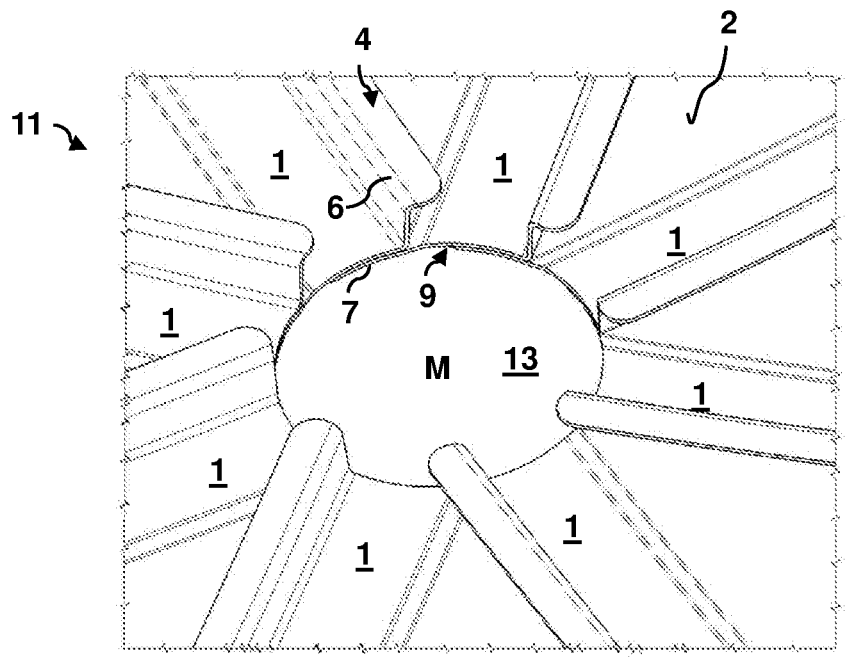
FIG. 5 shows a schematic perspective detailed view of further joint transitions of the pressure bulkhead from FIG. 2.

The joint transitions between the individual dome segments 1 are to be explained hereunder by FIGS. 4 and 5. To this end, FIG. 4 in an example manner shows a schematic perspective detailed view of a joint transition 9 of the pressure bulkhead from FIG. 2. FIG. 5, in a complimentary manner thereto, shows a schematic perspective detailed view of further joint transitions 9 of the pressure bulkhead 10 in the region of the central passage 13 about the center M. The cover 5 depicted above the central passage 13 in FIG. 2 is not shown for reasons of clarity in FIG. 5.

As can be derived from the figures, the integrated reinforcements 4 have in each case an approximately Z-shaped reinforcement profile 6 which projects from the concave internal face 2 of the respective dome segment 1. The integrated reinforcement 4 is in each case configured only on one side as a peripheral reinforcement on the dome segments 1. Each dome segment 1 in this specific example on an opposite side has a non-reinforced mating region 7 on which the respective nearest dome segment 1 bears by way of the associated integrated reinforcement 4 (peripheral reinforcement). In principle, the mating region 7 in alternative embodiments can likewise be reinforced, for example be provided with a thickening or the like. The dome segments 1 at the joint transitions 9 can be joined to one another, for example, by riveting, welding, and/or adhesive bonding, or another suitable method. The local reinforcements 8 and/or the (pressure) cover or covers 5 can likewise be fastened and closed in a pressure-tight manner by respective methods. The joint transitions 9, including potentially present joint grooves and/or similar clearances to be sealed, to be caulked, or to be smoothed, respectively, can be caulked, smoothed, and/or closed in a pressure-tight manner by way of a sealant, a caulking material, and/or sealing elements.

The choice of a thermoplastic plastics material herein offers several advantages. In particular, dome segments 1 of this type, having a Z-shaped reinforcement profile 6, can be made in a time-efficient and cost-efficient manner, for example in that fiber-reinforced PPS plates, organic sheets, or the like are heated and molded in a press. An integrated reinforcement 4 having a Z-shaped reinforcement profile 6 can be demolded without any significant complexity. The dome segments 1 have subsequently only to be welded, to be riveted, and/or to be adhesively bonded to one another (for example with a peripheral overlap). The integrated reinforcements 4 herein ensure a sufficient compressive rigidity of the pressure dome 11. The pressure bulkhead 10 shown, or the pressure dome 11 shown, respectively, is significantly lighter than comparable embodiments from a metallic material, and moreover is significantly more cost-effective in production than conventional fiber-composite solutions which are made by RTM, manual lamination, or the like methods. The dome segments 1 serve as modular components, so to speak, which can be provided, for example, in various embodiments, for example having dissimilar dome thicknesses, with or without passage openings, etc. In this way, simple individual customer-specific changes are possible in a rapid manner and without great complexity.

In the preceding detailed description, various features have been combined in one or more examples in order to improve the cogency of the illustration. However, it should be clear that the above description is merely illustrative but in no way restrictive in nature. The description serves to cover all the alternatives, modifications and equivalents of the various features and example embodiments. Many other examples will be immediately and directly clear to a person skilled in the art based on their expert knowledge in view of the above description.

For example, apart from Z-shaped reinforcement profiles 6, differently shaped "open" reinforcement profiles, for example O-shaped profiles, etc., which can easily be molded using the known manufacturing methods for fiber-reinforced thermoplastic plastics materials can likewise be used. For example, the dome segments 1 can have a centrically configured reinforcement having one or a plurality of O-shaped reinforcement profiles. The O-shaped reinforcement profiles can be provided additionally or alternatively to the above Z-shaped reinforcement profiles 6 (peripheral reinforcements). Reinforcements of this type, like the Z-shaped reinforcement profiles 6, can run along the radial direction R of the pressure dome 11. In the illustrations shown, eight dome segments 1 have been joined to one another. A different number of dome segments 1, for example two, three, four, five, six, seven, nine or more dome segments, can likewise be joined so as to form a pressure dome 11.

The example embodiments have been chosen and described to enable the principles underlying the disclosure herein and their possible uses in practice to be illustrated as well as possible. This will enable those skilled in the art to modify and use the disclosure herein and its various example embodiments in an optimum way in respect of the intended purpose. In the claims and the description, the terms "containing" and "having" are used as linguistically neutral concepts for the corresponding term "comprising". Furthermore, use of the terms "a" and "an" is not intended, in principle, to exclude a plurality of features and components described in this way.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

1 Dome segment
2 Concave internal face
3 Convex external face
4 Integrated reinforcement
5 Cover
6 Reinforcement profile
7 Mating region
8 Local reinforcement
9 Joint transition
10 Pressure bulkhead
11 Pressure dome
12 Passage opening
13 Central passage
100 Aircraft
101 Pressurized fuselage
102 Aft region
M Center
R Radial direction
A Azimuthal direction

The invention claimed is:

1. A pressure bulkhead for pressure-tight axial closure of a pressurized fuselage of an aircraft or spacecraft that is capable of being put under an internal pressure, the pressure bulkhead comprising:
   a plurality of dome segments, having an integrated reinforcement, which are in each case made integrally from a fiber-reinforced thermoplastic plastics material, and are joined to one another to form a pressure dome;
   wherein the integrated reinforcement has a reinforcement profile, which projects from a concave internal face of a respective one of the dome segments;
   wherein the integrated reinforcement is configured on one side as a peripheral reinforcement;
   wherein the dome segments, by way of the integrated reinforcement, are in each case joined to a mating region of a nearest one of the dome segments;
   wherein the dome segments about a center of the pressure dome are disposed beside one another along an azimuthal direction of the pressure dome;
   wherein the integrated reinforcement is aligned along a radial direction of the pressure dome;
   wherein the integrated reinforcement is in each case configured only on one side as a peripheral reinforcement on the dome segments; and
   wherein each dome segment has a non-reinforced mating region on an opposite side, on which the respective nearest dome segment bears by way of the integrated reinforcement associated therewith.

2. The pressure bulkhead according to claim 1, wherein the reinforcement profile is configured as Z-shaped and/or Ω-shaped.

3. The pressure bulkhead according to claim 1, wherein the dome segments are joined to one another by at least one of riveting, welding, and adhesive bonding.

4. The pressure bulkhead according to claim 1, further comprising local reinforcements which are joined to the dome segments.

5. The pressure bulkhead according to claim 4, wherein the local reinforcements are joined to the dome segments by at least one of riveting, welding, and adhesive bonding.

6. The pressure bulkhead according to claim 4, wherein at least a portion of the local reinforcements are aligned along an azimuthal direction of the pressure dome.

7. The pressure bulkhead according to claim 4, wherein at least a portion of the local reinforcements are disposed in an annular manner about passage openings in the dome segments.

8. The pressure bulkhead according to claim 1, wherein the dome segments have a variable dome thickness.

9. The pressure bulkhead according to claim 1, wherein joint transitions between the dome segments are closed by at least one of sealant, caulking material, and sealing elements.

10. An aircraft or spacecraft having a pressure bulkhead for pressure-tight axial closure of a pressurized fuselage of an aircraft or spacecraft that is capable of being put under an internal pressure, the pressure bulkhead comprising:
- a plurality of dome segments, having an integrated reinforcement, which are in each case made integrally from a fiber-reinforced thermoplastic plastics material, and are joined to one another to form a pressure dome;
- wherein the integrated reinforcement has a reinforcement profile, which projects from a concave internal face of a respective one of the dome segments;
- wherein the integrated reinforcement is configured on one side as a peripheral reinforcement;
- wherein the dome segments, by way of the integrated reinforcement, are in each case joined to a mating region of a nearest one of the dome segments;
- wherein the dome segments about a center of the pressure dome are disposed beside one another along an azimuthal direction of the pressure dome;
- wherein the integrated reinforcement is aligned along a radial direction of the pressure dome;
- wherein the integrated reinforcement is in each case configured only on one side as a peripheral reinforcement on the dome segments; and
- wherein each dome segment has a non-reinforced mating region on an opposite side, on which the respective nearest dome segment bears by way of the integrated reinforcement associated therewith.

* * * * *